US010565266B2

(12) United States Patent
Perez

(10) Patent No.: US 10,565,266 B2
(45) Date of Patent: Feb. 18, 2020

(54) METHOD AND SYSTEM FOR MULTIPLE PROFILE CREATION TO MITIGATE PROFILING

(71) Applicant: Konica Minolta Laboratory U.S.A., Inc., San Mateo, CA (US)

(72) Inventor: Maria Perez, Half Moon Bay, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 301 days.

(21) Appl. No.: 15/280,256

(22) Filed: Sep. 29, 2016

(65) Prior Publication Data

US 2018/0091627 A1    Mar. 29, 2018

(51) Int. Cl.
*G06F 16/95*    (2019.01)
*H04L 29/08*    (2006.01)
*H04L 29/12*    (2006.01)

(52) U.S. Cl.
CPC .......... *G06F 16/95* (2019.01); *H04L 67/303* (2013.01); *H04L 61/2092* (2013.01); *H04L 61/6004* (2013.01); *H04L 61/6022* (2013.01); *H04L 61/6059* (2013.01)

(58) Field of Classification Search
CPC ........ H04L 2463/102; H04L 29/12066; H04L 29/12349; H04L 29/12584; H04L 61/1511; H04L 61/157; H04L 61/2503; H04L 63/1441; H04L 63/1466; H04L 63/1483; H04L 67/306; H04L 67/02; H04L 63/0236; H04L 67/22; H04L 63/102; H04L 67/303; H04L 63/0876; H04L 41/00; H04L 63/08; H04L 63/20; G06Q 30/0277; G06Q 30/02; G06Q 30/0241; G06Q 30/0251; G06Q 30/0261; G06Q 30/0269; G06F 21/6245; G06F 11/3495; G06F 2201/875; G06F 21/60
USPC .... 709/201, 225, 203, 224, 229, 202; 726/5, 726/22, 26, 27; 455/410
See application file for complete search history.

(56) References Cited

U.S. PATENT DOCUMENTS 8,407,482 B2 * 3/2013 Ghosh ............... H04L 29/12594
                                                        713/189
8,468,175 B2   6/2013 Obata
9,390,272 B2 * 7/2016 Barnes ................ G06F 21/60
(Continued)

OTHER PUBLICATIONS

JT Newsome; How to Trick Websites into Thinking You're on a Different OS or Browser; Feb. 26, 2013; pp. 1-5 (Year: 2013).*

*Primary Examiner* — Tonia L Dollinger
*Assistant Examiner* — Linh T. Nguyen
(74) *Attorney, Agent, or Firm* — Buchanan Ingersoll & Rooney PC

(57) ABSTRACT

A method, a computer readable medium, and a client device are disclosed, which create multiple profiles to mitigate profiling of the client device on a network. The method includes generating a request on the client device, the request including a uniform resource locator (URL) indicating a source hosting content; forwarding the request to a profile generation application on the client device, the profile generation application configured to generate a plurality of requests for the request, and wherein only one request of the plurality of requests has system information pertaining to the client device; and sending the plurality of requests to the network to retrieve the content hosted on the source.

14 Claims, 4 Drawing Sheets

(56) References Cited

U.S. PATENT DOCUMENTS

| | | | | |
|---|---|---|---|---|
| 2002/0156812 | A1* | 10/2002 | Krasnoiarov | H04L 29/06 715/234 |
| 2003/0080997 | A1* | 5/2003 | Fuehren | G06Q 30/02 715/744 |
| 2003/0187995 | A1* | 10/2003 | Fok | H04L 29/06 709/227 |
| 2008/0201401 | A1* | 8/2008 | Pugh | H04L 63/1441 709/201 |
| 2010/0094612 | A1* | 4/2010 | Weerasinghe | H04L 67/306 703/23 |
| 2012/0030576 | A1* | 2/2012 | Bell | G06F 21/6263 715/738 |
| 2013/0103853 | A1* | 4/2013 | Lyon | H04L 61/6086 709/238 |
| 2013/0212249 | A1* | 8/2013 | Groat | H04L 9/16 709/223 |
| 2013/0212658 | A1* | 8/2013 | Amaya Calvo | H04L 63/1441 726/6 |
| 2013/0254364 | A1* | 9/2013 | Moganti et al. | H04L 12/24 709/223 |
| 2015/0067866 | A1* | 3/2015 | Ibatullin | G06F 21/554 726/25 |
| 2015/0067885 | A1* | 3/2015 | Kim | G06F 21/6245 726/27 |
| 2018/0032628 | A1* | 2/2018 | Anderson | G06F 16/957 |

* cited by examiner

METHOD AND SYSTEM FOR MULTIPLE PROFILE CREATION TO MITIGATE PROFILING

FIELD OF THE INVENTION

The present disclosure relates to a method and system for multiple profile creation to mitigate profiling, and more particularly, to a method and system for generating a request on a client device, the request including a uniform resource locator (URL) indicating a source hosting content, and generating a plurality of requests for the request, wherein only one request of the plurality of requests has system information pertaining to the client device to mitigate profiling of the client device.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (for example, packetizing, routing, flow control).

Web analytics can be described as the measurement, collection, analysis, and reporting of internet data for purposes of understanding and optimizing web usage from accountability and accounting aspect. Web analytics provides information about the number of visitors to a website and the number of page views, and can help gauge traffic and popularity trends, which can be useful for example, for market research. Web analytics can be used as a tool for business and market research including improving the effectiveness of a website. However, web analytics can also be used to exploit the identity of users and/or systems upon which devices are hosted.

For example, known profiling tools collect social media and traffic data to profile users. Businesses use behavioral tracking to personalize marketing strategies and increase sales. Governments track their citizens' behavior to determine threats to the general population and even suppress basic human rights. Moreover, privacy and security discussions are at an all-time high. All of these tools have the capacity to store the system information and match such information with potential security exploits in a system.

SUMMARY OF THE INVENTION

Accordingly, it would be desirable to avoid such profiling to a user by creating a redundant pool of possible information by which is not possible to obtain all the system information with certainty by capturing network traffic, profiling or otherwise.

A method is disclosed of creating multiple profiles to mitigate profiling of a client device on a network, the method comprising: generating a request on the client device, the request including a uniform resource locator (URL) indicating a source hosting content; forwarding the request to a profile generation application on the client device, the profile generation application configured to generate a plurality of requests for the request, and wherein only one request of the plurality of requests has system information pertaining to the client device; and sending the plurality of requests to the network to retrieve the content hosted on the source.

A non-transitory computer readable medium containing a computer program having computer readable code embodied to carry out a method of creating multiple profiles to mitigate profiling of a client device on a network is disclosed, the method comprising: generating a request on the client device, the request including a uniform resource locator (URL) indicating a source hosting content; forwarding the request to a profile generation application on the client device, the profile generation application configured to generate a plurality of requests for the request, and wherein only one request of the plurality of requests has system information pertaining to the client device; and sending the plurality of requests to the network to retrieve the content hosted on the source.

A client device is disclosed having a profile generation application for creating multiple profiles to mitigate profiling of the client device on a network, the profile generation application configured to: receive a request from a web browser on the client device, the request including a uniform resource locator (URL) indicating a source hosting content; generate a plurality of requests for the request, and wherein only one request of the plurality of requests has system information pertaining to the client device; and forward the plurality of requests to a network stack on the client device to send to the network to retrieve the content hosted on the source.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
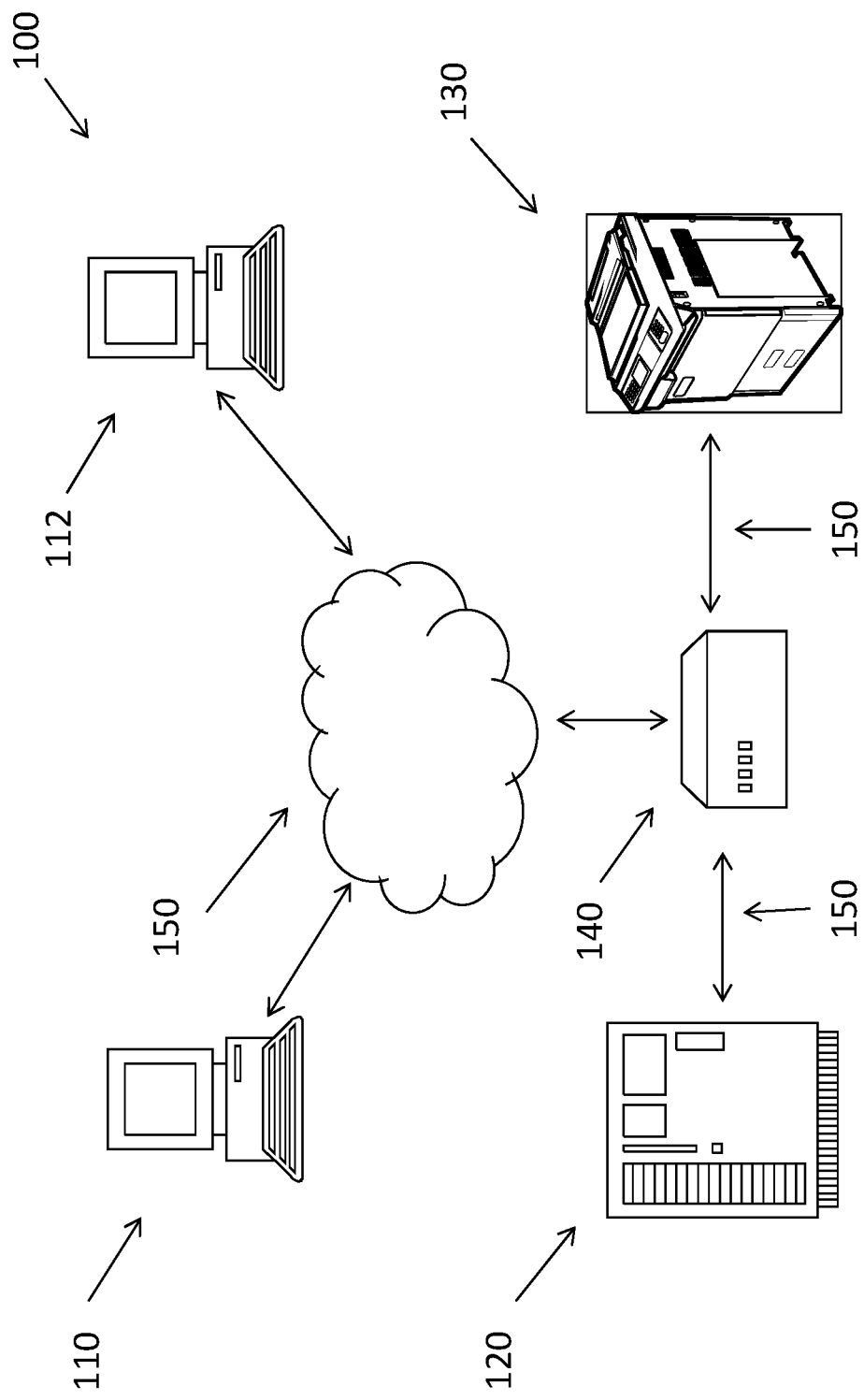
FIG. 1 is an illustration of a network diagram in which a method and system for creating multiple profiles to mitigate profiling, which can be implemented in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

There are known profiling applications which provide all kinds of data. The profiling applications can be for both monitoring traffic to a website and also enhancing a user's experience with the website and/or related products, for example. However, the user cannot ascertain if the information being sent over the communication network is secure and that the information being returned to the user is from a trusted server or non-trusted server or source. For example, this kind of information or data being send over the network can be used maliciously to hack into user's accounts.

For example, a profiling application can intercept a computer request to an airline for tickets. The profiling application can see the version of the web browser being used, and can use the search including the version of the web browser to exploit or hack into the client device or computer. Accordingly, it would be desirable to have a method or system, for example, a safe profile application, which creates more than one profile such that there will be a variety of information created making it less likely for a hacker or someone interested in unauthorized access to a computer or client device to identify the computer or client devices' weaknesses.

In accordance with an exemplary embodiment, a variety of request, for example, a plurality of requests can be created to confuse an eavesdropping application, for example, hosted on a web server 120 or a router 140 (FIG. 1). For example, in accordance with an exemplary embodiment, the plurality of requests can be generated by different network scenarios of the client device, for example, network filtering, or where other processes are more preferable or available, such as local host addressing in IPv4 or IPv6 link local addressing.

When using a network there is a great deal of system information that is sent about an environment, for example, the operating system and version of the operating system, the web browser used and version of the web browser, any relevant plug-in and versions associated therewith. A profiling application capturing the profiles on the Internet (or wire) could capture this information over time and provide information or data, which could be indicative or a weak point or vulnerability to a system, and in which unauthorized access to the system occurs, for example, the system could be hacked. In accordance with an exemplary embodiment, a variety of profiles are created that can mangle the information being sent. Although this can be performed at the application level, the generation of a variety or a plurality of profiles can also be done transparently by intercepting the packages before the transport layer using a network filter, or at a lower level using other methods such as IPv6 link local addressing, or IPv4 local host addressing. An exemplary example is disclosed wherein the request (or package) is intercepted on the transport layer using a network filter.

In accordance with an exemplary embodiment, a method and system are disclosed for creation of multiple profiles to mitigate profiling of client devices such that when using a program sending system information to a communication network, for example, the Internet, there will be a plurality of queries (N queries) created for which only one query (1 query) is valid in sense that only one query includes actual system information associated with the client device. The system information can include, for example, a version of a web browser, a version of an operating system, one or more versions of plugins associated with the client device, domain name server (DNS), and/or search engine.

In accordance with an exemplary embodiment, a safe profiling application (or a profile generation application) can be configured to record or store only the actual request and/or response associated with the client device and all of the other requests and/or responses will not be stored or record the non-valid or fake queries or profiles generations and sent to the network. Accordingly, the safe profiling application can be configured that only the valid query will pass the information to the user and automatically delete all previous history associated with the non-valid or fake profiles or queries. In addition, in accordance with an exemplary embodiment, the generation of the plurality of requests (or profiles) can occur during each transaction or request, and not only during an initial request to a web server, printer, or client device as disclosed herein.

FIG. 1 is an illustration of a network 100 in which a method and system for creating multiple profiles to mitigate profiling, which can be implemented in accordance with an exemplary embodiment. The network 100 can include, for example, in for example, an office setting, one or more client devices 110, 112, at least one server 120, at least one printer or multifunction printer device (MFP) 130, one or more network switches or routers 140, and a network connection 150.

In accordance with an exemplary embodiment, each of the one or more client devices 110, 112 can include a processor or central processing unit (CPU), and one or more memories for storing software programs and data (such as files to be printed). The processor or CPU carries out the instructions of a computer program, which operates and/or controls at least a portion of the functionality of the client devices 110, 112. Each of the client devices 110, 112, can also include an operating system (OS), which manages the computer hardware and provides common services for efficient execution of various software programs. For example, the software programs can include application software and printer driver software. Examples of client devices 110, 112 can include and are not limited to personal computers and/or personal digital assistants (PDAs).

In accordance with an exemplary embodiment, the at least one server (or a source hosting content) 120 can include a processor or central processing unit (CPU), and one or more memories for storing software programs and data. The processor or CPU carries out the instructions of a computer program, which operates and/or controls at least a portion of the functionality of the at least one server 120. The server 120 can also include an operating system (OS), which manages the computer hardware and provides common services for efficient execution of various software programs. For example, in accordance with an exemplary embodiment, the at least one server (or source hosting content) 120 can be a web server, which hosts a plurality of web services. The plurality of web services can includes websites, which host one or more web pages, and/or web-enabled applications. For example, the web-enabled applications can be configured to help integrate company systems so they share information and connect employees, suppliers, and administrators to automated business processes.

In accordance with an exemplary embodiment, the at least one multi-functional printer device (MFP) or printer 130 can be connected to the one or more client devices 110, 112. The one or more client devices 110, 112 can be configured to submit print jobs to the at least one multifunction printers or printers 130 by transmitting data representing the documents to be printed and information describing the print job. The at least one multifunction printer or printer 130 can include a printer controller (or firmware), a memory section preferably in the form of a hard disk drive (HDD), an image processing section (or data dispatcher), a print engine, and an input/output (I/O) section.

In accordance with an exemplary embodiment, the one or more network switches or routers 140 can include, for example, an Ethernet switch, for example, an Ethernet switch having Link Layer Discovery Protocol (LLDP), a gateway, a router, and the like.

In accordance with an exemplary embodiment, the one or more clients 110, 112, the at least one server 120, the at least one printer 130, the one or more data switches or routers 140 are preferably connected via the Internet or communication network (or network) 150. The communication network 150 may include, for example, a conventional type network, wired or wireless, and may have any number of configurations, such as a star configuration, token ring configuration, or other known configurations. The communication network 150 may include one or more local area networks ("LANs"), wide area networks ("WANs") (e.g., the Internet), virtual private networks ("VPNs"), peer-to-peer networks, near-field networks (e.g., Bluetooth™), cellular networks (for example, 3G, 4G, other generations), and/or any other interconnected data path across which multiple computing nodes may communicate.

In accordance with an exemplary embodiment, data may be transmitted in encrypted or unencrypted form between the nodes of the communication network (or network) 150 using a variety of different communication protocols including, for example, various Internet layer, transport layer, or application layer protocols. For example, data may be transmitted via the networks 150 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 2:
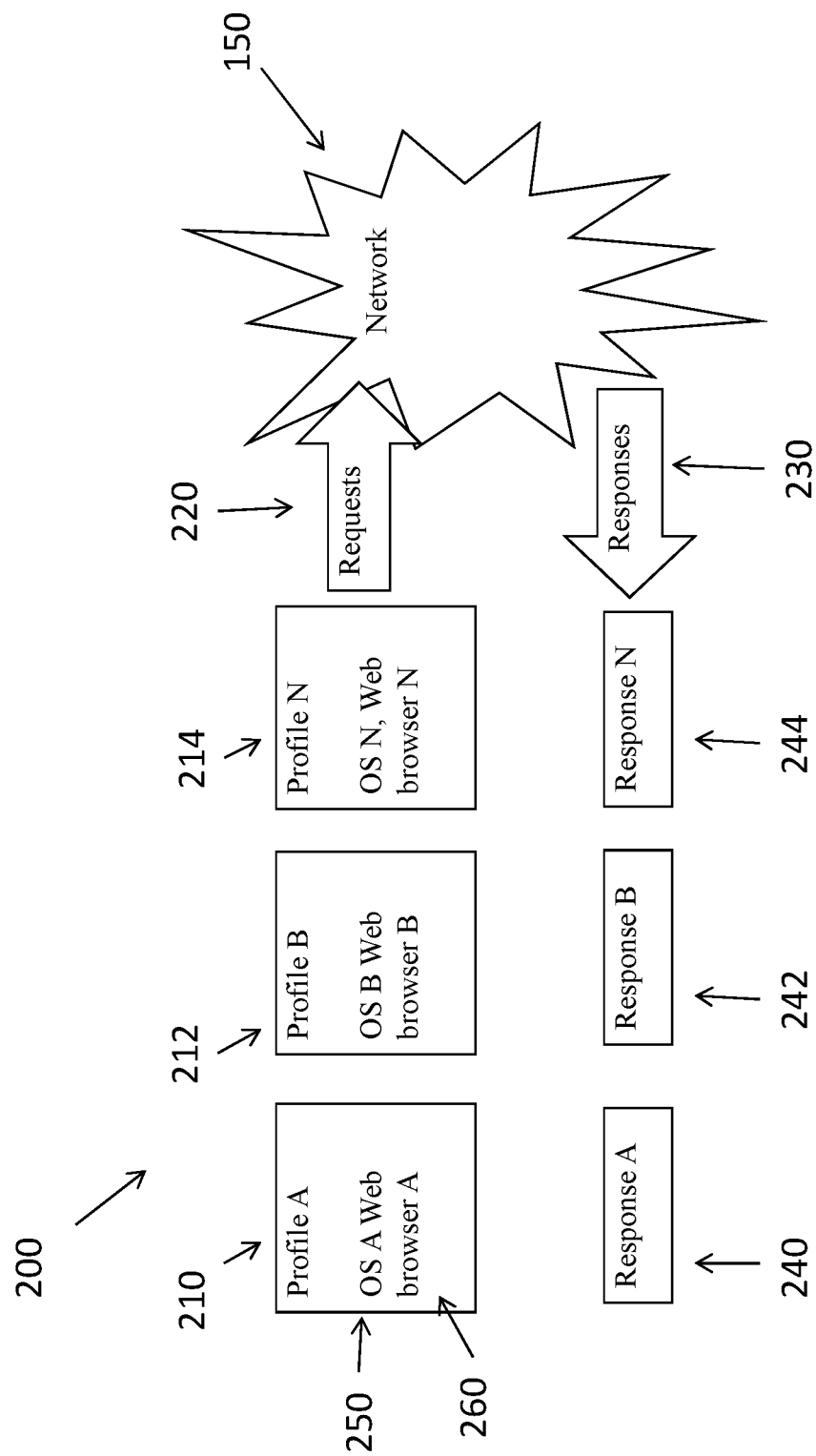
FIG. 2 is an illustration of a profile generation application for creating multiple profiles to mitigate profiling in accordance with an exemplary embodiment.

FIG. 2 is an illustration of an exemplary embodiment of a profile generation application 200 for creating multiple profiles to mitigate profiling in accordance with an exemplary embodiment. As shown in FIG. 2, for example, a plurality of profiles 210, 212, 214, can be generated, each of the plurality of profiles 210, 212, 214, (Profile A, Profile B, Profile N) for example, having a different Operating System (OS) 250 or a different version of the same Operating System (OS) 250, (OS A, OS B, OS N), and a different web browser 260 or a different version of the same web browser 260 (Web browser A, Web browser B, Web Browser N). In addition, the plurality of profiles 210, 212, 214 can also include information related to plugins or software components that add a specific feature to an existing computer program. For example, when a program supports plug-ins, it enables customization. The common examples are the plug-ins used in web browsers to add new features such as search engines, virus scanners, or the ability to use a new file type such as a new video format.

As disclosed above, each of the one or more client devices 110, 112, will be running an operating system 250 that manages the computer hardware and software resources and provides common services for the computer programs on the one or more client devices 110, 112. The web browser 260 can be hosted on a client device or computer 110, 112, and is a software application that retrieves, presents, and traverses information resources on, for example, the World Wide Web. The World Wide Web is an information space where documents and other web resources are identified by URLs (Uniform Resource Locators), interlinked by hypertext links, and can be accessed via, for example, the Internet. In accordance with an exemplary embodiment, the web browser can include a search engine or software system that designed to search for information on the World Wide Web, and wherein the search results are generally presented in a line of results often referred to as search engine result pages (SERPs).

As shown in FIG. 2, the profile generation application 200 can generate a plurality of requests 220 for a web page, image, video, or other piece of content hosted on a server 120, for example, a web server. Each of the plurality of requests (or queries) 220 including a uniform resource locator (URL) indicating a server 120 hosting content in which the client device 110, 112 wishes to retrieve or view. In addition, each of the plurality of requests (or queries) 200 can have a different profile 210, 212, 214, and wherein only one, for example, 210, is valid, and the remainder of the plurality of profiles 212, 214, are invalid or fake profiles. In addition to requesting web pages, images, videos or other pieces of content hosted on a server 120, the system and method disclosed herein can be used for initiating print jobs on the client device 110, 112, to be printed on a printer 130, exchange of e-mail using known e-mail protocols, for example, FTP (File Transfer Protocol), SMTP (Simple Mail Transfer Protocol), POP/IMAP—Post Office Protocol (POP)/Internet Message Access Protocol (IMAP), and e-mail filtering, and any exchange conducted over a network 150 in which a request is sent and a corresponding response is received by, for example, the client device 110, 112.

In accordance with an exemplary embodiment, each of the requests 220 can be, for example, a HTTP (Hypertext Transfer Protocol) request (or packet), can include, for example, a request line (for example, GET/Images/logo.png HTTP/1.1), request header fields, an empty line, and an optional message body. Other known protocols can include, for example, Gopher, DPDY, and HTTP/2. Although the application 200 generates the plurality of requests 220, and sends the requests to the network 150, in accordance with an exemplary embodiment, only the request 220, which has a valid profile, for example, profile 210 is saved. The invalid queries or requests 220, which have a fake or invalid profile 212, 214, can be automatically deleted once the requests 220 are sent to the network 150. In response to the requests 220, a plurality of responses 230 are received from the network 150. The plurality of responses 230 include, for example, a status line and reason message, response header fields, an empty line, and an optional message body. Each of the plurality of responses 230 (Response A 240, Response B 242, Response N 244) corresponds to one of the original requests or profiles 210, 212, 214. As set forth above, only the valid response, for example, Response A 240 is passed to the client device 110, 112. In accordance with an exemplary embodiment, for example, the number of responses 230 generated can be 5 or more, 10 or more, or even 20 or more. However, as set forth herein, only one of the plurality of responses 230 has actual system information pertaining to the client device, for example, client device 110.

Figure 3:
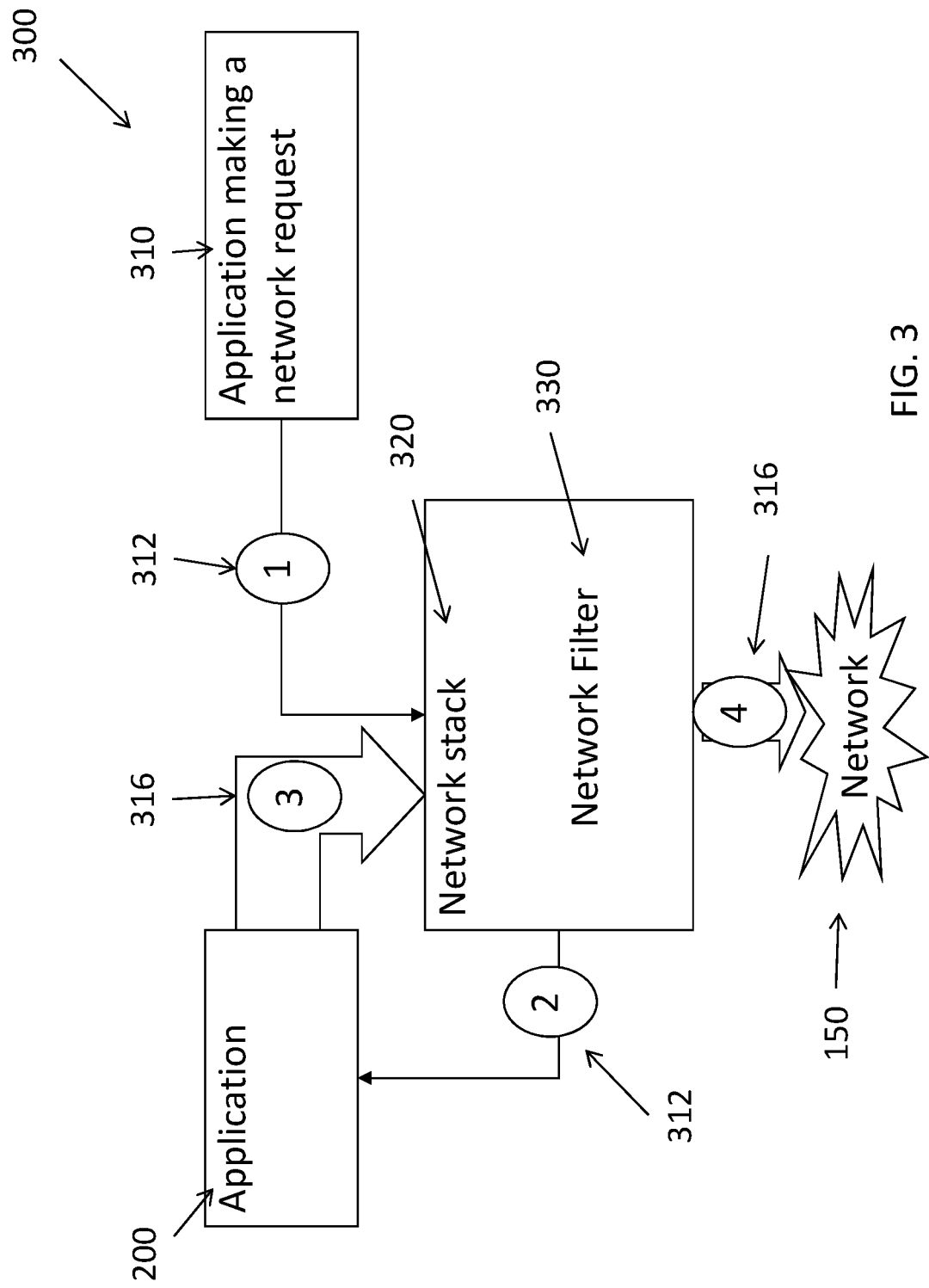
FIG. 3 is a flow chart illustrating a profile generation application for creating multiple profiles to mitigate profiling in accordance with an exemplary embodiment.

FIG. 3 is a flow chart 300 illustrating an exemplary embodiment of a profile generation application 200 for creating multiple profiles to mitigate profiling in accordance with an exemplary embodiment. As shown in FIG. 3, the one or more client devices 110, 112, includes an application 310, for example, a web browser, which generates a request (or valid request) 312 for a web page, image, video, or other piece of content hosted on the server 120 and/or the printer 130. For example, the request 312 can include a print job to be printed on the printer 130, which is located in a remote location from the at least one client device 110, 112. The request 312, for example, the print job is sent to the network stack (or computer networking protocol suite or stack) 320, which is hosted on the client device 110, 112. The network stack 320 preferably includes the protocols (for example, HTTP, TCP, IP, Ethernet, IEEE 802.3) and layers (Application, Transport, Internet/Network, Data Link/Link, Physical) for transmitting the request 312 to the server 120 for retrieval of the requested web page, image, video, or other piece of content hosted on the server 120 and/or the printer 130.

As shown in FIG. 3, the request 312 is received by the network stack 320 and is intercepted by a network filter 330, which forwards the request 312 to the profile generation application 200. In accordance with an exemplary embodiment, the interception of the request 312 by the network filter 330 can be accomplished, for example, by local host addressing using IPv4 or by IPv6 link local addressing using IPv6. The request 312 is then forward to the profile generation application 200, which generates a plurality of requests 316, each of the plurality of request (or queries) 316 having a different profile 210, 212, 214, and wherein only one, for example, 210, is valid, and the remainder of the plurality of profiles 212, 214, are invalid or fake profiles.

In accordance with an exemplary embodiment, the plurality of requests 316 can then be sent back to the network stack 320 where the plurality of requests (or information packets or packets) 316 are forwarded from the network stack 320 to the network 150 to the destination (for example, server 120 and/or printer 130) for retrieval of the web page, image, video, or other piece of content hosted, for example, on the server (for example, a web server) 120 and/or the printer 130.

In accordance with an exemplary embodiment, the profile generation application 200 can use the IPv4 local host addresses for creations of the plurality of requests 316, each of the plurality of requests having a different profile 210, 212, 214. For example, the packets instead of being intercepted by the network filter 330 would go directly from one socket to the other, and the profile generation application 200 would create the plurality of requests 316 using the real information (for example, OS (operating system), web browser, and/or plugins) for only one of the plurality of requests created.

In accordance with an exemplary embodiment, a plurality of requests 316 can be created to confuse an eaves dropping application, however, the method and system to accomplish such task can accommodate different network scenarios, where some processes are feasible, for example network filtering or where other processes are more preferable or available, for example, IPv6 link local addressing. Thus, by creating a plurality of requests 316, each of the plurality of request 316 having a different profile 210, 212, 214, the probability of being profiled by a profiling application can be decreased. In addition, the ways to accomplish or generate the plurality of requests 316, can include, for example, network filtering, IPv4 local host addressing, and/or IPv6 link local dedicated addressing.

For example, in accordance with an exemplary embodiment, the method and system as disclosed herein can be used with IPv6 link local addressing to help hide the configuration of the client or host devices 110, 112. The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages. When first connected to a network, an IPv6 host sends a link-local multicast neighbor solicitation request advertising its tentative link-local address for double address detection (dad) if no problem is encountered the host uses the link-local address. The router solicitations are sent (or router advertisements are received depending on timing) to obtain network-layer configuration parameters, routers respond to such a request with a router advertisement packet that contains network-layer configuration parameters.

For example, most network interfaces come with an embedded IEEE Identifier (i.e., a link-layer MAC address), and in those cases, stateless address autoconfiguration uses the IEEE identifier to generate a 64-bit interface identifier. By design, the interface identifier is likely to be globally unique when generated in this fashion. The interface identifier is in turn appended to a prefix to form the 128-bit IPv6 address. The first-half 64 bits are allocated to a network prefix included in router advertisement (RA) from the router. The second-half 64 bits are allocated to a EUI-64 format interface ID as a 64-bit identifier decided by the IEEE.

Since most IPv6 capable device with stateless addressing including client devices and image forming apparatuses typically will include a unique identifier or Media Access Control address (MAC address). The MAC address is assigned to network adapters or network interface cards (NICs) by the manufacturer for identification, and used in the Media Access Control protocol sublayer of the Internet Protocol Version 6 (IPv6). If assigned by the manufacturer, a MAC address usually encodes the manufacturer's registered identification number. However, the MAC address can also be known as an Ethernet Hardware Address (EHA), hardware address, adapter address, or physical address. When using the protocol stateless addressing for IPv6, which is required by the IPv6 Ready Logo Program, both link-local addresses and global addresses are determined by concatenating an identifier unique to the network adapter (or network interface card) of the device. However, since the MAC ID does not change as long as the physical hardware adapter is not changed, the use of the MAC ID for generating IPv6 addresses could subject the apparatus 130 or client device 110 to additional security risks. Accordingly, the package or request from the application (or web browser) 310 can be directed from one socket to another socket, and the application 200 can create the plurality of requests 316 as disclosed herein.

In accordance with an exemplary embodiment, the number of the plurality of requests 316 generated by the profile generation application 200 can be determined based on one or more factors including, for example, destination of the request initiated by the application (or Web browser) 310. For example, in accordance with an exemplary embodiment, if the destination of the request is a trusted Website or server, for example, a known server or website versus a non-trusted web site, for example, a new or unknown server or website, the number of request 316 is greater for a non-trusted (i.e., new or unknown) server or website than for a trusted (i.e., known) server or website.

In addition, the number of requests 316 generated by the profile generation application 200 can be based on the type of communication network or network 150 in which the plurality of requests 316 will be transmitted. For example, for more secure networks, for example, a local area network (LAN) and/or a wired network versus a WAN (wide area network) or non-wired or wireless network, the number of requests 316 can be less than for the non-secure networks. In addition, the number of requests 316 can vary depending on the type of network and related security, for example, IPv4 versus IPv6.

Figure 4:
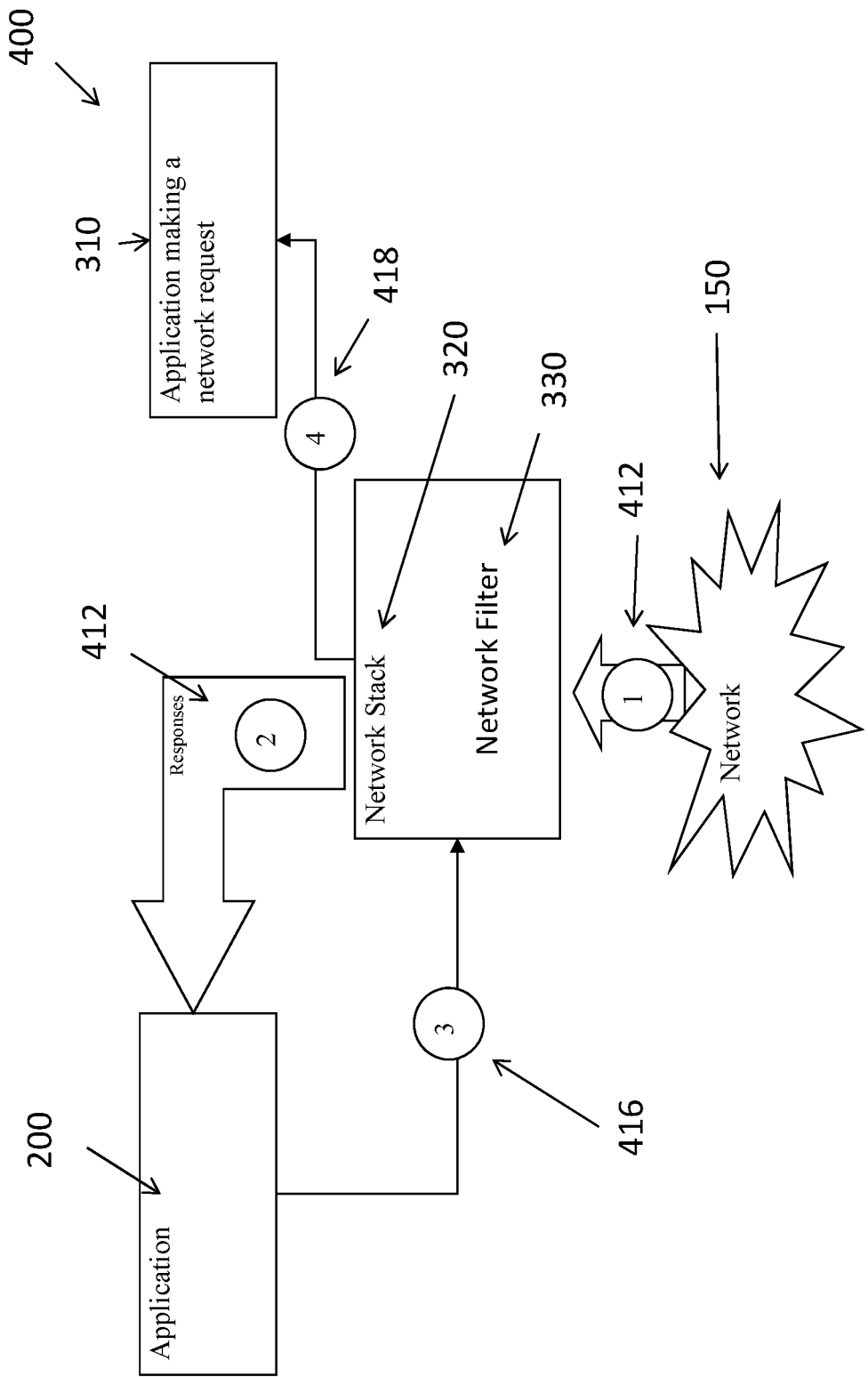
FIG. 4 is a flow chart illustrating a profile generation application for creating multiple profiles to mitigate profiling in accordance with an exemplary embodiment.

FIG. 4 is a flow chart 400 illustrating an exemplary embodiment of an application for creating multiple profiles to mitigate profiling in accordance with an exemplary embodiment. In response to the plurality of requests 316, the client device 110, 112, will receive a plurality of responses 412 from the destination, for example, the server 120 and/or the printer 130. As shown in FIG. 4, the plurality of responses 412 are received by the network stack 320 and forwarded, for example, by the network filter 330 to the profile generation application 200. After receiving the plurality of responses 412, the profile generation application 200 keeps only the requested data 416 (i.e., response to actual request having profile, which includes, for example, the web browser and operating system (OS)) of the client device 110, and discards all the other responses from the plurality of responses 412 received from the network 150.

In accordance with an exemplary embodiment, the profile generation application 200 sends the requested data 416 to the network stack, where the requested data is injected into the response 418 (or packet, for example, an HTTP packet). The response 418 is then sent to the application 310 making the request, and wherein the web page, image, video, or other piece of content hosted by the server 120 and/or the printer 130 is delivered to the client device 110, 112. In accordance with an exemplary embodiment, the profile generation application 200 can be configured such that all the responses 412 are discarded. For example, in accordance with an exemplary embodiment, the profile generation application 200 can be configured such that the application 200 does not store or save any history of the plurality of requests 316 and/or responses 412.

In accordance with an exemplary embodiment, a non-transitory computer readable medium containing a computer program having computer readable code embodied to carry out a method of creating multiple profiles to mitigate profiling of a client device on a network is disclosed, the method comprising: generating a request on the client device, the request including a uniform resource locator (URL) indicating a second client device hosting content; forwarding the request to a profile generation application on the client device, the profile generation application configured to generate a plurality of requests for the request, and wherein only one request of the plurality of requests has system information pertaining to the client device; and sending the plurality of requests to the network to retrieve the content hosted on the second client device.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of creating multiple profiles to mitigate profiling of a client device on a network, the method comprising:
   generating a request on the client device, the request including a uniform resource locator (URL) indicating a source hosting content; and
   forwarding the request to a profile generation application on the client device, the profile generation application configured to:
   generate a plurality of requests for the request, each of the plurality of requests configured to retrieve a same content from the source, wherein the plurality of requests includes at least one or more versions of an operating system version, and one or more versions of a web browser, and wherein only one request of the plurality of requests includes a version of a web browser and a version of an operating system associated with the request of the client device;
   send the plurality of requests to the network to retrieve the same content hosted on the source;
   receive a plurality of responses in response to the plurality of requests sent to the network for the same content from the source;
   forward a response from the plurality of responses which is in response to the one of the plurality of requests having the version of the web browser and the version of the operating system associated with the request of the client device to the client device, and
   discard each of the plurality of responses, which does not contain the version of the web browser and the version of an operating system associated with the request of the client device.

2. The method of claim 1, comprising:
   adding one or more versions of at least one plug-in to each of the plurality of requests, and wherein the only one request of the plurality of requests having the system information pertaining to the client device includes a version of each of the at least one plugins with the request of the client device.

3. The method of claim 1, comprising:
   intercepting the request with a network filter in a network stack on the client device for forwarding the request to the profile generation application.

4. The method of claim 1, comprising:
   directing the request with local host addressing in an IPv4 network or an IPv6 link local addressing in an IPv6 network to the profile generation application.

5. A non-transitory computer readable medium containing a computer program having computer readable code embodied to carry out a method of creating multiple profiles to mitigate profiling of a client device on a network, the method comprising:
   generating a request on the client device, the request including a uniform resource locator (URL) indicating a source hosting content; and
   forwarding the request to a profile generation application on the client device, the profile generation application configured to:
   generate a plurality of requests for the request, each of the plurality of requests configured to retrieve a same content from the source, wherein the plurality of requests includes at least one or more versions of an operating system version, and one or more versions of a web browser, and wherein only one request of the plurality of requests includes a version of a web browser and a version of an operating system associated with the request of the client device;

send the plurality of requests to retrieve the same content hosted on the source;

receive a plurality of responses in response to the plurality of requests sent to the network for the same content from the source;

forward a response from the plurality of responses which is in response to the one of the plurality of requests having the version of the web browser and the version of the operating system associated with request of the client device to the client device; and discard each of the plurality of responses, which does not contain the version of the web browser and the version of an operating system associated with the request of the client device.

6. The computer readable medium of claim 5, comprising: adding one or more versions of at least one plug-in to each of the plurality of requests, and wherein the only one request of the plurality of requests having the system information pertaining to the client device includes a version of each of the at least one plugins with the request of the client device.

7. The computer readable medium of claim 5, comprising: intercepting the request with a network filter in a network stack on the client device for forwarding the request to the profile generation application.

8. The computer readable medium of claim 5, comprising: directing the request with local host addressing in an IPv4 network or an IPv6 link local addressing in an IPv6 network to the profile generation application.

9. A client device having a profile generation application for creating multiple profiles to mitigate profiling of the client device on a network, the profile generation application configured to:

receive a request from a web browser on the client device, the request including a uniform resource locator (URL) indicating a source hosting content;

generate a plurality of requests for the request, each of the plurality of requests configured to retrieve a same content from the source, wherein the plurality of requests includes at least one or more versions of an operating system version, and one or more versions of a web browser, and wherein only one request of the plurality of requests includes a version of a web browser and a version of an operating system associated with the request of the client device;

forward the plurality of requests to a network stack on the client device to send to the network to retrieve the same content hosted on the source;

receive a plurality of responses in response to the plurality of requests sent to the network for the same content from the source;

forward a response from the plurality of responses which is in response to the one of the plurality of requests having the version of the web browser and the version of the operating system associated with request of the client device to the client device; and discard each of the plurality of responses, which does not contain the version of the web browser and the version of an operating system associated with the request of the client device.

10. The client device of claim 9, comprising:

adding one or more versions of at least one plug-in to each of the plurality of requests, and wherein the only one request of the plurality of requests having the system information pertaining to the client device includes a version of each of the at least one plugins with the request of the client device.

11. The client device of claim 9, wherein the network stack on the client device is configured to intercept the request with a network filter and forward the request to the profile generation application.

12. The client device of claim 9, wherein the client device is configured to direct the request with local host addressing in an IPv4 network or an IPv6 link local addressing in an IPv6 network to the profile generation application.

13. The method of claim 1, wherein the request is for a web page, an image, or a video hosted by the source.

14. The method of claim 1, wherein the network is an IPv6 network, the method further comprising:

sending the plurality of request over the IPv6 network with an IPv6 link local addressing.

* * * * *